United States Patent
Hong et al.

(10) Patent No.: US 9,386,478 B2
(45) Date of Patent: Jul. 5, 2016

(54) METHOD AND APPARATUS FOR CONTROLLING ACCESS TO MACHINE-TYPE COMMUNICATION DEVICE HAVING DUAL PRIORITY APPLICATION

(71) Applicant: KT CORPORATION, Gyeonggi-do (KR)

(72) Inventors: Sung Pyo Hong, Seoul (KR); Woo Jin Choi, Seoul (KR); Hyun Pyo Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/389,414

(22) PCT Filed: Mar. 14, 2013

(86) PCT No.: PCT/KR2013/002065
§ 371 (c)(1),
(2) Date: Sep. 30, 2014

(87) PCT Pub. No.: WO2013/151246
PCT Pub. Date: Oct. 10, 2013

(65) Prior Publication Data
US 2015/0085658 A1    Mar. 26, 2015

(30) Foreign Application Priority Data

Apr. 4, 2012  (KR) .................. 10-2012-0035116
May 24, 2012  (KR) .................. 10-2012-0055238
Sep. 6, 2012  (KR) .................. 10-2012-0098705

(51) Int. Cl.
*H04W 28/02*    (2009.01)
*H04W 76/02*    (2009.01)
*H04W 4/00*    (2009.01)
*H04W 4/22*    (2009.01)
*H04L 29/06*    (2006.01)

(52) U.S. Cl.
CPC ........... *H04W 28/0289* (2013.01); *H04L 69/28* (2013.01); *H04W 4/005* (2013.01); *H04W 4/22* (2013.01); *H04W 76/02* (2013.01)

(58) Field of Classification Search
CPC ... H04W 28/0289; H04W 4/005; H04W 4/22; H04W 76/02; H04L 69/28
See application file for complete search history.

(56) References Cited

U.S. PATENT DOCUMENTS 7,447,152 B2    11/2008  Kim et al.
2010/0099402 A1*  4/2010  Wu .................... H04W 76/027
                                                    455/423

(Continued)

FOREIGN PATENT DOCUMENTS

KR   10-2004-0048568 A   6/2004
KR   10-2005-0076158 A   7/2005

OTHER PUBLICATIONS

Rahul Vaidya et al., "Network Congestion Control: Mechanisms for Congestion Avoidance and Recovery", ACWR 11 Proceedings of the 1st International Conference on Wireless Technologies for Humanitarian Relief, ACM, Nov. 2011, pp. 199-207.

(Continued)

*Primary Examiner* — Curtis A Alia
(74) *Attorney, Agent, or Firm* — IP Legal Services, LLC

(57) ABSTRACT

A method for controlling access to a machine-type communication (MTC) device having a dual priority application in a mobile communication network. More particularly, a signaling method executed in a terminal configured to perform non-access stratum (NAS) signaling including low access priority indication in a mobile communication network and configured such that the low access priority is negligible. The signaling method may include performing one of a procedure of mobility management and a session management including the low access priority, receiving a back-off timer due to one of mobility management congestion control and session management congestion control and operating the back-off timer, and performing one of the mobility management procedure and the session management procedure without including the low access priority.

5 Claims, 4 Drawing Sheets

(56) References Cited

U.S. PATENT DOCUMENTS

| | | | | |
|---|---|---|---|---|
| 2012/0244828 A1* | 9/2012 | Tiwari | ............... | H04W 76/007 455/404.1 |
| 2013/0203399 A1* | 8/2013 | Gupta | ............... | H04W 28/12 455/418 |

OTHER PUBLICATIONS

Huawei et al., "EAB for E-UTRAN", S2-121057, 3GPP SA WG2 Meeting #89, Vancouver, Canada, Feb. 6-10, 2012.

* cited by examiner

FIG.2

| 8 | 7 | 6 | 5 | 4 | 3 | 2 | 1 | |
|---|---|---|---|---|---|---|---|---|
| DEVICE PROPERTIES IEI | | | | 0 SPARE | 0 SPARE | 0 SPARE | LOW PRIORITY | OCTET1 |

METHOD AND APPARATUS FOR CONTROLLING ACCESS TO MACHINE-TYPE COMMUNICATION DEVICE HAVING DUAL PRIORITY APPLICATION

CROSS REFERENCE TO RELATED APPLICATIONS

This application is a National Stage Patent Application of PCT International Patent Application No. PCT/KR2013/002065 (filed on Mar. 14, 2013) under 35 U.S.C. §371, which claims priority to Korean Patent Application Nos. 10-2012-0035116 (filed on Apr. 4, 2012), 10-2012-0055238 (filed on May 24, 2012) and 10-2012-0098705 (filed on Sep. 6, 2012), the teachings of which are incorporated herein in their entireties by reference.

TECHNICAL FIELD

The present invention relates to a method and an apparatus for controlling access to a Machine Type Communication (MTC) device having a dual priority application in a mobile communication network.

BACKGROUND ART

A Machine Type Communication (MTC) is one type of data communication and refers to communication between devices or objects (Machine to Machine (M2M) communication) with minimal human interaction or without human interaction.

A User Equipment (UE) used for MTC may periodically transmit/receive data to/from an MTC application server through a mobile communication network. A UE used for MTC has a time tolerant characteristic or a delay tolerant characteristic. Such a delay tolerant UE for MTC is processed with a lower priority compared to a general UE in Non-Access Stratum (NSA) signaling, so that a mobile communication service provider can efficiently accept a large amount of MTC devices. To this end, 3rd Generation Partnership Project (3GPP) defines device property IEs for processing NAS signaling with a low priority and defines specification that may reject preferentially the NAS signaling having the low priority when overload is generated in the network. Configuration information for the NAS signaling having the low priority may be allocated to each device. That is, the UE for MTC may be configured to have one of a low priority and a normal priority.

Meanwhile, although the UE for MTC is configured to perform the NAS signaling with the low priority, the UE for MTC may be required to make access with the normal priority in case of specific conditions. For example, an electric meter is configured to transmit a report with a low priority. However, when an emergency is detected, (e.g., when the device is being stolen), the electric meter may desire to transmit an alarm signal thereof with the normal priority. In this case, the network may not be able to process the emergency signal.

DETAILED DESCRIPTION OF THE INVENTION

Technical Problem

The present invention has been made to solve the above problems, and an aspect of the present invention is to provide a method for enabling a UE for MTC to access a server through low priority signaling in case of regular data communication and to access a server through normal priority signaling in case of specific conditions in a 3GPP mobile communication network.

Technical Solution

In accordance with an aspect of the present invention, a signaling method is provided executed by a User Equipment (UE) configured to perform Non-Access Stratum (NAS) signaling including a low access priority indication and associated with an indication that a low access priority can be overridden. The signaling method may include: performing one of a mobility management procedure and a session management procedure including the low access priority; receiving a back-off timer due to one of a mobility management congestion control and a session management congestion control and operating the back-off timer; and performing one of the mobility management procedure and the session management procedure without including the low access priority.

In accordance with another aspect of the present invention, a signaling control method executed by a mobility management entity in a mobile communication network is provided. The signaling control method may include: receiving an attach request including a low access priority from a User Equipment (UE); transmitting an attach rejection message including a value for a back-off timer to the UE; receiving one of the attach request which does not include the low access priority and the attach request including an indication which is not the low access priority from the UE while the back-off timer is running; determining whether the UE can perform a dual priority operation in which the low access priority is overridden; and performing an attach procedure when the UE can perform the dual priority operation.

In accordance with another aspect of the present invention, a User Equipment (UE) configured to perform NAS signaling with a low access priority and associated with indication that the low access priority can be overridden is provided. The UE may be configured to perform one of a mobility management procedure and a session management procedure including the low access priority, to receive a back-off timer due to one of a mobility management congestion control and a session management congestion control, to operate the back-off timer, and to perform one of the mobility management procedure and the session management procedure without including the low access priority.

In accordance with another aspect of the present invention, a mobility management entity of a mobile communication network is provided. The mobility management entity includes a dual priority manager. The dual priority manager may be configured to receive an attach request including a low access priority from a User Equipment (UE), to transmit an attach rejection message including a value for a back-off timer to the UE, to determine whether the UE can perform a dual priority operation in which the low access priority can be overridden when receiving an attach request which does not include the low access priority or an attach request including an indication which is not the low access priority from the UE, and to perform an attach procedure when the UE can perform the dual priority operation.

Effects of the Invention

According to embodiments, the UE may attempt to make access through low priority signaling in regular data communication and to make access through normal priority signaling in specific conditions. Accordingly, it is possible to perform signaling without using the low priority in the specific conditions where robbery of the UE is detected while effectively controlling overload generated due to the UE.

BRIEF DESCRIPTION OF THE DRAWINGS

FIG. 2 illustrates device property IEs;

MODE FOR CARRYING OUT THE INVENTION

Figure 1:
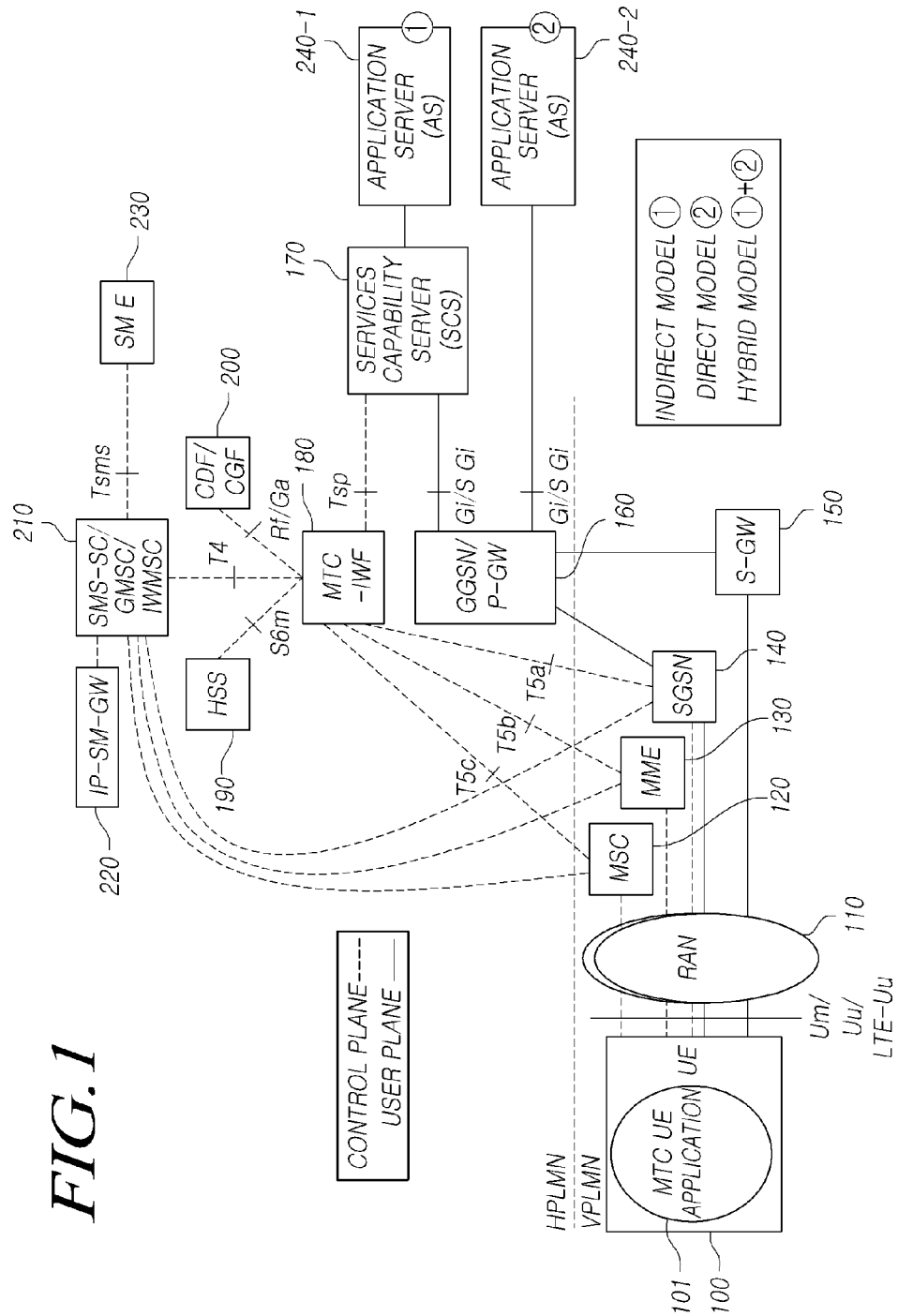
FIG. 1 illustrates a 3GPP system as an exemplary structure to which an embodiment of the present invention may be applied.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a 3GPP system as an exemplary structure to which an embodiment of the present invention may be applied.

In FIG. 1, a UE 100 is a UE for Machine Type Communication (MTC). The UE 100 may include one or more MTC applications 101.

A Radio Access Network (RAN) 110 is a radio access network which the UE 100 can access.

A Mobile Switching Center (MSC) 120 is a circuit switching-based mobile switching center.

A Mobility Management Entity (MME) 130 is an entity on a control plane for supporting a mobility management function within an Evolved Packet Service (EPS).

A Serving GPRS Support Node (SGSN) 140 is a packet switching-based mobile switching center for performing a mobility management function.

A Serving GateWay (S-GW) 150 is a gateway traversing an interface to an Evolved UMTS Terrestrial Radio Access Network (E-UTRAN).

A Gateway GPRS Support Node/PDN Gate Way (GGSN/P-GW) 160 is an entity providing interworking between a General Packet Radio Service (GPRS) network and an external packet switching network and is a gateway traversing an interface to a Packet Data Network (PDN).

A Service Capability Server (SCS) 170 is an entity used for communicating with the UE 100 for MTC and is connected to an MTC-IWF 180 or an SMS-SC 210 of a Home Public Land Mobile Network (HPLMN) for device triggering. The SCS 170 may be used by one or more MTC applications.

The Machine Type Communication InterWorking Function (MTC-IWF) 180 is an entity performing a function of relaying or translating a signaling protocol used for executing a particular function within a mobile communication network through an interface (Tsp) with the SCS 170.

A Home Subscriber Server (HSS) 190 is an entity including subscription-related information required for providing support of session processing to a network entity as a master database for the user.

A Charging Data Function/Charging Gateway Function (CDF/CGF) 200 is an entity performing a charging function.

A Short Message Service-Service Center/Gateway Mobile Switching Center/Interworking Mobile Switching Center (SMS-SC/GMSC/IW MSC) 210 is an entity providing a short message service between entities which transmit/receive a short message.

An IP Short Message GateWay (IP-SM-GW) 220 performs a message conversion function between an SMS message and an IP message.

A Short Message Entity (SME) 230 is an entity transmitting/receiving a short message and may be the UE or the SCS 170 in the example of FIG. 1.

Application Servers (ASs) 240-1 and 240-2 are entities hosting an MTC application of an external network.

The MTC application 101 within the UE 100 and the ASs 240-1 and 240-2 of the external network may be connected in various ways. In an indirect model, the AS 240-1 indirectly connects with the network through a service of the SCS 170 in order to perform indirect user plane communication with the UE 100 or use an additional service such as device triggering. In a direct model, the AS 240-2 directly connects with the network without passing through the SCS 170. In a hybrid model, the AS simultaneously uses both the direct model and the indirect model.

In typical 3GPP standard, the UE 100 may be configured with a low access priority or configured through an Open Mobile Alliance (OMA) Device Management (DM) or Universal Subscriber Identity Module (USIM) Over The Air (OTA) procedure in order to perform Non-Access Stratum (NAS) signaling including a lower priority indication. Such a low priority NAS signaling configuration information included in the USIM is defined in 3GPP TS 24.368. The UE 100 is configured to perform the NAS signaling including the low priority indication (UE configured for low access priority) according to the configuration of the UE inserts device properties Information Elements (IEs) contained in a NAS signaling message indicate that the UE 100 is configured for the low access priority.

FIG. 2 illustrates an example of the device property IEs. Further, Table 1 describes the content of the device property IEs.

TABLE 1

| Low priority (octet 1) |  |
| --- | --- |
| Bit 1 | |
| 0 | MS is not configured for NAS signalling low priority |
| 1 | MS is configured for NAS signalling low priority |
| Bits 2, 3 and 4 of octet 1 are spare and shall be coded as zero. | |

Referring to FIG. 2 and Table 1, among a total of 8 bits of the device property IEs, a first 1 bit is used for indicating a priority. When the first bit is 0, the UE is not configured for the NAS signaling low priority (that is, configured for the normal priority). When the first bit is 1, the UE is configured for the NAS signaling low priority. Second to fourth bits are left as empty spaces. Fifth to eighth bits are parts to which Information Element Identify (IEI) for indicating information on characteristics is allocated.

The UE 100 configured with the low access priority should transmit the low access priority indication (set the device property IEs as 1) during a NAS signaling procedure with the MME 130 and may transmit the low access priority indication with a Radio Resource Control (RRC) establishment cause configured as "delay tolerant" also during an RRC connection establishment procedure with an eNodeB 111 within the RAN 110.

When the network detects mobility management signaling congestion, the network performs a NAS level mobility management congestion control. The NAS level mobility management congestion control includes a general NAS level mobility management congestion control and a subscribed Access Point Number (APN) based congestion control.

Under a general overload condition, the network may reject a mobility management NAS signaling request (for example, an attach request) from the UE. When the general NAS level mobility management congestion control is activated, the network may reject a NAS signaling message including the low priority indication before rejecting a NAS signaling message which does not include the low priority indication.

When the subscribed APN based congestion control is activated, the network may reject an attach request from the UE having subscribed to the APN.

When the NAS level mobility management congestion control is activated, the network may transmit a rejection message including a value for a mobility management back-off timer (T3346 timer) to the UE and the UE starts the back-off timer with the value included in the mobility management rejection message.

The UE cannot initiate the NAS request for the mobility management procedure during an operation of the mobility management back-off timer except for some specific conditions. Such specific conditions may include a detach procedure, a service user having a specific access class, an emergency service, and a mobile incoming call service.

When the MME 130 detects an EPS Session Management (ESM) congestion associated with a specific APN, the MME 130 may reject an EPS session management request (for example, PDN connection, bearer resource allocation, or bearer resource modification request) from the UE 100 by a session management back-off timer. When an APN congestion control is activated, the MME 130 may store the session management back-off timer in every UE 100. When the UE 100 receives the session management back-off timer within an EPS session rejection message, the UE 100 cannot initiate a session management procedure before the EPS session management back-off timer expires.

As described above, when the mobility management back-off timer and the session management back-off timer operate due to the overload control, the application 101 requiring the normal priority access cannot communicate with the application server 240 except for specific conditions.

According to an embodiment of the present invention, the UE configured to perform the NAS signaling including the low priority indication may override the low priority NAS signaling configuration by the application requiring the normal priority access and perform the NAS signaling including a normal priority indication (set the device property IEs as 0) even while the back-off timer operates due to the overload control as described above.

Figure 3:
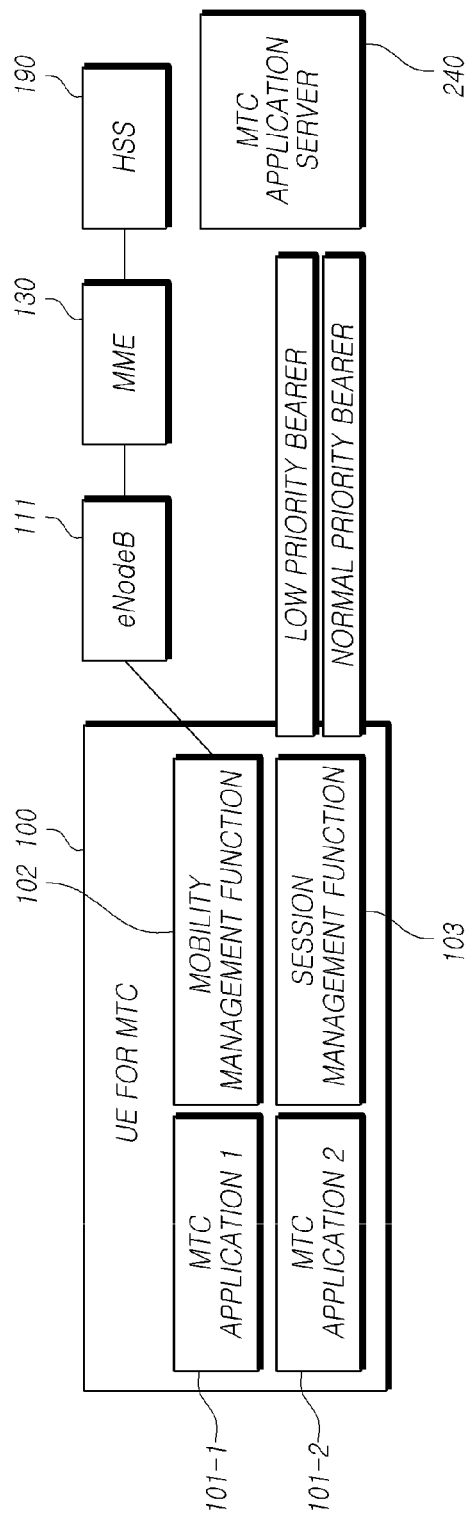
FIG. 3 is a view describing an access control method according to an embodiment of the present invention.

FIG. 3 is a view describing an access control method according to an embodiment of the present invention.

In the embodiment of the present invention, the network may define subscription information for an operation and may determine whether an operation is allowed based on the defined subscription information.

That is, when the UE 100 used for MTC inserts an indication of support of a dual priority application into the subscription information within the HSS 190 as a part of the UE subscription information used for MTC and when the UE 100 performs regular communication with an MTC application server or a normal mobility management procedure, the UE 100 configured to perform the NAS signaling including the low priority may be configured to perform the NAS signaling including the low priority indication. However, in specific conditions (for example, when the device is stolen, when the device leaves a position where the device is to be installed, when a particular monitoring event of an MTC device is detected, and the like), UE 100 configured to perform the NAS signaling including the low priority may be configured to perform the NAS signaling without including the low priority indication (configured for NAS signaling low priority overriding). Further, the subscription information may further include a reference point that may enable performing NAS signaling without the low priority indication. For example, the reference point may include application information, MTC-IWF information, AS information, SCS information and the like.

During the attach procedure or during a Tracking Area Update (TAU) procedure, the UE 100 may perform the NAS signaling including the low priority indication. However, in the above described specific conditions, the UE 100 may perform the NAS signaling without including the low priority indication. The MME 130 may identify whether the UE 100 is allowed to perform the NAS signaling which does not include the low priority, by making an inquiry into the subscription information of the HSS 190. To this end, the MME 130 may keep the subscription information in UE context information.

When the overload is generated in the network and thus the NAS level mobility management congestion control is activated during the attach procedure or the TAU procedure of the UE 100 configured to perform the NAS signaling including the low priority, the MME 130 transmits a rejection message to the low priority UE 100 and the UE 100 starts the mobility management back-off timer.

When the UE 100 is configured to support the dual priority even the UE 100 is configured to perform the NAS signaling including the low priority, the UE 100 may initiate the NAS signaling by the application 101-1 or 101-2 which can perform the NAS signaling without including the low priority while the back-off timer operates by the low priority NAS signaling.

When the application 101-1 or 101-2 which can perform the NAS signaling without including the low priority (that is, the application which can perform the NAS signaling with the normal priority or the high priority) desires to initiate the NAS signaling while the mobility management back-off timer operates by the NAS signaling including the low priority indication, the UE 100 may stop the mobility management back-off timer and initiate the NAS signaling. Alternatively, the UE 100 may maintain the mobility management back-off timer and initiate the NAS signaling.

When the UE 100 is configured to support the dual priority even if the UE 100 is configured to perform the NAS signaling including the low priority (UE configured for low access priority), the UE 100 initiating the NAS signaling without the low priority indication caused by the normal priority application may transmit a normal mobile outgoing call access indication by configuring an RRC establishment cause for the NAS signaling as "MO data" or "MO signaling" rather than "delay tolerant" during an RRC connection establishment procedure with the eNodeB 111.

The MME 130 checks whether the UE 100 can perform the NAS signaling without including the low priority indication in a specific condition since the UE supports the dual priority. During the operation of the mobility management back-off timer, when it is determined that the UE can perform the NAS signaling without including the low priority indication, the MME 130 may release the mobility management back-off timer and perform the NAS signaling procedure. Alternatively, the MME 130 may maintain the mobility management back-off timer and perform the NAS signaling procedure.

During the operation of the session management back-off timer (e.g. T3396 timer) by the NAS signaling including the low priority indication, when the UE 100 transmits a NAS session management request message (sets the device property IEs as 0) which does not include the low priority indication to configure a new PDN connection which does not include the low priority indication by an application which can perform the NAS signaling without including the low priority indication, the MME 130 may transmit a create session request message not including the low priority indication to the S-GW 150 or the P-GW 160 or transmit the create session request message including an indication which is not the low priority. When the PDN connection is configured, a priority associated with the PDN connection is not changed until the PDN connection is deactivated.

In another method, during the operation of the session management back-off timer by the NAS signaling including the low priority indication, when the UE 100 transmits a NAS session management request message (sets the device property IEs as 0) which does not include the low priority indication to configure a new PDN connection which does not include the low priority indication by an application which can perform the NAS signaling without including the low priority indication, the UE 100 stops the session management back-off timer and transmits a NAS session management message which does not include the low priority indication, and the MME 130 may release the session management back-off timer and transmit a create session request message which does not include the low priority indication to the S-GW 150 or the P-GW 160 or transmit the create session request message including an indication which is not the low priority. When the PDN connection is configured, a priority associated with the PDN connection is not changed until the PDN connection is deactivated. The priority indication may be included in a charging record in a home network and a visited network. To this end, the priority indication should be stored in an EPS bearer context of the MME 130.

When the UE 100 is configured by Extended Access Barring (EAB) by an operator, the UE 100 may not be allowed to make access.

In another embodiment, the UE 100 overrides information indicating that the UE 100 is configured to perform a dual priority operation, that is, the UE configured for the NAS signaling low priority overrides the NAS signaling low priority, defines information indicating that the UE is a UE configured to perform the NAS signaling with the normal priority, configures the information in the UE 100 (e.g. NAS Signaling Low Priority Overriding), and transmits a priority indication according to the configuration information to the network so that the UE 100 can be processed with the normal priority in the network. The priority indication means that the UE configured to perform the NAS signaling including the low priority overrides the low priority NAS signaling configuration by the application requiring the normal priority access and has the normal priority indication (sets the device property IEs as 0).

That is, the UE 100 may be pre-configured to support a dual priority application or configured through an OMA DM or USIM OTA procedure. When the UE 100 configured to support the dual priority application performs regular data communication or performs a general mobility management procedure, the UE 100 may insert the low priority indication into the device property IEs within the NAS message and transmit the NAS signaling message.

When the NAS level mobility management congestion control is activated during the attach procedure or during the TAU procedure of the UE 100 configured to perform the NAS signaling including the low priority because the overload is generated in the network, the MME 130 transmits a rejection message to the low priority UE 100 and the UE 100 starts the mobility management back-off timer.

When the UE supports the dual priority even the UE 100 is configured to perform the NAS signaling including the low priority, the UE 100 may initiate the NAS signaling by the application 101-1 or 101-2 which can perform the NAS signaling without including the low priority during the operation of the back-off timer by the low priority NAS signaling. The NAS signaling message may include a priority indication (setting the device property IEs as 0) according to the configuration of the support of the dual priority.

When the application 101-1 or 101-2 which can perform the NAS signaling without including the low priority (that is, the application which can perform the NAS signaling with the normal priority or the high priority) desires to initiate the NAS signaling while the mobility management back-off timer operates by the NAS signaling including the low priority indication, the UE 100 may stop the mobility management back-off timer and initiate the NAS signaling. Alternatively, the UE 100 may maintain the mobility management back-off timer and initiate the NAS signaling.

When the UE 100 supports the dual priority even the UE 100 is configured to perform the NAS signaling including the low priority (UE configured for low access priority), the UE 100 initiating the NAS signaling without the low priority indication (setting the device property IEs as 0) caused by the normal priority application may transmit a normal mobile outgoing call access indication by configuring an RRC establishment cause for the NAS signaling as "MO data" or "MO signaling" rather than "delay tolerant" during an RRC connection establishment procedure with the eNodeB 111.

The MME 130 may identify whether the UE 100 can perform the NAS signaling without including the low priority indication in a specific condition since the UE 100 supports the dual priority. When it is determined that the UE can perform the NAS signaling without including the low priority indication during the operation of the mobility management back-off timer, the MME 130 may release the mobility management back-off timer and perform the NAS signaling procedure. Alternatively, the MME 130 may maintain the mobility management back-off timer and perform the NAS signaling procedure. In another method, the MME 130 may perform the NAS signaling procedure without identifying whether the UE can perform the NAS signaling without including the low priority indication in a specific condition since the UE supports the dual priority.

During the operation of the session management back-off timer by the NAS signaling including the low priority indication, when the UE 100 transmits a NAS session management request message (sets the device property IEs as 0) not including the low priority indication to configure a new PDN connection which does not include the low priority indication by an application which can perform the NAS signaling without including the low priority indication, the MME 130 may transmit a create session request message not including the low priority indication to the S-GW 150 or the P-GW 160 or transmit the create session request message including an indication which is not the low priority. When a PDN connection is configured, a priority associated with the PDN connection is not changed before the PDN connection is deactivated.

In another method, during the operation of the session management back-off timer by the NAS signaling including the low priority indication, when the UE 100 transmits a NAS session management request message (setting the device property IEs as 0) not including the low priority indication to configure a new PDN connection which does not include the low priority indication by an application which can perform the NAS signal without including the low priority indication, the UE 100 stops the session management back-off timer and transmits a NAS session management message not including the low priority indication (setting the device property IEs as 0), and the MME 130 may release or maintain the session management back-off timer and transmit a create session request message not including the low priority indication to the S-GW 150 or the P-GW 160 or transmit the create session request message including an indication which is not the low priority. When the PDN connection is configured, a priority associated with the PDN connection is not changed until the PDN connection is deactivated. The priority indication may be included in a charging record in a home network and a visited network. To this end, the priority indication should be stored in EPS bearer context of the MME 130.

When the UE 100 is configured by Extended Access Barring (EAB) by an operator, the UE 100 may not be allowed to make access.

In another embodiment, in addition to the existing procedure for the low priority NAS signaling, the UE 100 and the network may include a new procedure for controlling a dual application.

When the UE 100 configured to perform the NAS signaling including the low priority perform regular data communication or the general mobility management procedure, the UE 100 may insert the low priority indication into the device property IEs within the NAS message and transmit the NAS signaling message.

When the NAS level mobility management congestion control is activated during the attach procedure or the TAU procedure of the UE 100 configured to perform the NAS signal including the low priority because the overload is generated in the network, the MME 130 transmits a rejection message to the low priority UE 100 and the UE 100 starts the mobility management back-off timer.

The UE 100 configured to perform the NAS signaling including the low priority may initiate the NAS signaling by the application 101-1 or 101-2 which can perform the NAS signaling without including the low priority during the operation of the back-off timer. The NAS signaling message may include the priority indication according to the configuration of the support of the dual priority.

When the application 101-1 or 101-2 which can perform the NAS signaling without including the low priority (that is, the application which can perform the NAS signaling with the normal priority or the high priority) desires to initiate the NAS signaling while the mobility management back-off timer operates by the NAS signaling including the low priority indication, the UE 100 may stop the mobility management back-off timer and initiate the NAS signaling. Alternatively, the UE 100 may maintain the mobility management back-off timer and initiate the NAS signaling. At this time, the UE 100 may transmit the signaling message which does not include the low priority or includes an indication which is not the low priority.

When the UE 100 supports the dual priority even the UE 100 is configured to perform the NAS signaling including the low priority (UE configured for low access priority), the UE 100 initiating the NAS signaling not including the low priority indication caused by the normal priority application may transmit a normal mobile outgoing call access indication by configuring an RRC establishment cause for the NAS signaling as "MO data" or "MO signaling" rather than "delay tolerant" during an RRC connection establishment procedure with the eNodeB 111.

When the UE 100 having initiated the NAS signaling including the low priority indication transmits the NAS signaling message including the indication which is not the low priority, the MME 130 may process the NAS signaling message including the indication which is not the low priority in consideration of a network overload state, an operator's configuration or the like. For example, when the UE 100 having initiated the NAS signaling including the low priority indication according to the operator's configuration transmits the NAS signaling message including the indication which is not the low priority three times or less during the operation of the back-off timer, the MME 130 may be configured to process the NAS signaling message transmitted three times or less. The MME 130 may release the mobility management back-off timer and perform the NAS signaling procedure. Alternatively, the MME 130 may maintain the mobility management back-off timer and perform the NAS signaling procedure.

During the operation of the session management back-off timer by the NAS signaling including the low priority indication, when the UE 100 transmits a NAS session management request message (setting the device property IEs as 0) not including the low priority indication to configure a new PDN connection which does not include the low priority indication by an application which can perform the NAS signaling without including the low priority indication, the MME 130 may transmit a create session request message not including the low priority indication to the S-GW 150 or the P-GW 160 or transmit the create session request message including an indication which is not the low priority. When a PDN connection is configured, a priority associated with the PDN connection is not changed before the PDN connection is deactivated.

In another method, during the operation of the session management back-off timer by the NAS signaling including the low priority indication, when the UE 100 transmits a NAS session management request message (setting the device property IEs as 0) not including the low priority indication to configure a new PDN connection which does not include the low priority indication by an application which can perform the NAS signaling without including the low priority indication, the UE 100 stops the session management back-off timer and transmits a NAS session management message which does not include the low priority indication, and the MME 130 may maintain the session management back-off timer and transmit a create session request message which does not include the low priority indication to the S-TW 150 or the S-GW 160 or transmit the create session request message including an indication which is not the low priority. When the PDN connection is configured, a priority associated with the PDN connection is not changed until the PDN connection is deactivated. To this end, the priority indication should be stored in EPS bearer context of the MME 130.

When the UE 100 is configured by Extended Access Barring (EAB) by an operator, the UE 100 may not be allowed to access.

Figure 4:
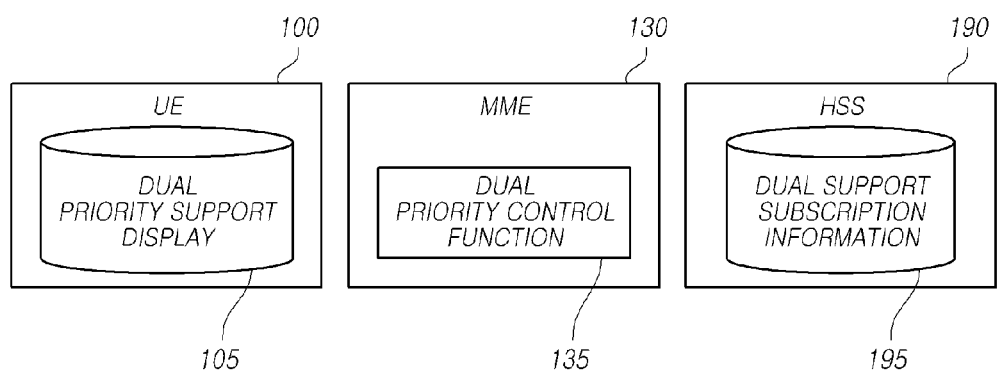
FIG. 4 illustrates information or a function included in a network entity according to at least one embodiment.

FIG. 4 illustrates information or a function included in a network entity according to at least one embodiment.

Referring to FIG. 4, the UE 100 may include information 105 indicating the support of the dual priority including the low priority and the normal priority, and/or the MME 130 may determine whether the UE 100 transmitting the signaling which is not the low priority supports the dual priority and may include a dual priority control function 135 for performing a control according to the determination result, and/or the HSS 190 may store subscriber information including the information 195 on whether the dual priority is supported and provide the subscriber information to another entity.

In another embodiment, the UE 100 defines information indicating that the UE 100 is configured to perform the dual priority operation. That is, the UE configured for the NAS signal low priority defines information indicating that the UE is configured to override the NAS signaling low priority and perform the NAS signaling with the normal priority (e.g. NAS Signaling Low Priority Overriding) and the network describes the PDN connection when performing the NAS level mobility management congestion control and/or APN based mobility management congestion control according to the NAS signaling priority requested by the UE.

The UE 100 configured to be able to perform the dual priority operation, that is, the UE (e.g. UE configured for dual priority or UE configured for NAS signaling Low Priority Overriding) which is configured for the NAS signaling low priority but can override the NAS signaling low priority, supports the dual priority application to override the NAS signaling low priority by the normal priority application or may be pre-configured to perform the NAS signaling with the normal priority or configured through an OMA DM or USIM OTA procedure.

When the UE 100 configured to support the dual priority application performs regular data communication by the low priority application or performs the mobility management procedure, the UE 100 may insert the low priority indication into the device property IEs within the NAS message and transmit the NAS signaling message.

The UE 100 configured to support the dual priority application may initiate the NAS signaling without including the low priority (setting the device property IEs as 0) by the application 101-1 or 102-2 which desires the NAS signaling without including the low priority.

During an initial attach procedure, the UE 100 configured to support the dual priority application performs the NAS signaling including the low priority.

When the low priority indication is inserted into a NAS session management request message (e.g. a PDN connectivity request message for a bearer configuration procedure within the attach procedure (default bearer establishment in attach procedure)) used for configuring a new PDN connection, the MME 130 inserts the low priority indication into a create session request message and forwards the create session request message to the S-GW 150 or the P-GW 160. When the PDN connection is configured, a priority associated with the PDN connection is not changed until the PDN connection is deactivated. In order to allow the S-GW to insert the low priority indication into a record, the low priority indication is stored in MME EPS bearer context.

Thereafter, when the UE 100 configured to support the dual priority application desires to initiate the NAS signaling without including the low priority (setting the device property IEs as 0) by the application 101-1 or 101-2 which desires the NAS signaling without including the low priority, the network supports multiple PDN connections by a network policy. When the UE has subscriptions to multiple PDNs, the UE 100 may make a request for a new PDN connection through a NAS session management request message (PDN connectivity request message) which does not include the low priority indication. That is, when the UE 100 has the subscriptions to an APN for the PDN connection which includes the low priority indication and an APN for the PDN connection which does not include the low priority indication, the UE 100 may make a request for a new PDN connection through a NAS session management request message (PDN connectivity request message) which does not include the low priority indication. At this time, the UE 100 inserts the APN into the PDN connection request which does not include the low priority indication and transmits the PDN connection request to the MME.

The PDN connection not including the low priority indication may be provided in addition to the PDN connection which includes the low priority indication.

In another method, the PDN connection not including the low priority indication may be provided by deactivating (e.g. detaching) the PDN connection including the low priority indication.

When the network does not support multiple PDN connections by the network policy or when the UE does not have subscriptions to multiple PDNs, that is, when the UE 100 does not have a subscription to an APN dedicated for the PDN connection which does not include the low priority indication, the UE 100 deactivates (detaches) the existing PDN connection including the low priority indication, performs an attach procedure to configure a new PDN connection, and transmits a NAS session management request message without including the low priority indication (setting the device property IEs as 0) in a PDN connectivity request message for a bearer configuration procedure within the attach procedure (default bearer establishment in attach procedure). The MME 130 may forward information indicating that the low priority indication is not included in the create session request message (setting the device property IEs as 0) to the S-GW 150 or the P-GW 160. When the PDN connection is configured, a priority associated with the PDN connection is not changed until the PDN connection is deactivated. In order to allow the S-GW to insert information indicating that the low priority indication is not included into a record, the low priority indication is stored in MME EPS bearer context.

When the UE 100 supports the dual priority even when the UE 100 is configured to perform the NAS signaling including the low priority (UE configured for low access priority), the UE 100 initiating the NAS signaling not including the low priority indication caused by the normal priority application may transmit a normal mobile outgoing call access indication by configuring an RRC establishment cause for the NAS signaling as "MO data" or "MO signaling" rather than "delay tolerant" during an RRC connection establishment procedure with the eNodeB 111.

In another method, when the UE 100 configured to support the dual priority application desires to initiate the NAS signaling without including the low priority (setting the device property IEs as 0) by the application 101-1 or 101-2 which desires the NAS signaling without including the low priority, the UE first attempts the NAS signaling including the low priority independently from whether the network supports multiple PDN connections and the UE has the subscriptions to multiple PDNs. When the UE receives a rejection message from the network by a NAS level mobility management congestion control or an APN-based mobility management congestion control, the UE may initiate the NAS signaling which does not include the low priority (setting the device property IEs as 0) as described.

For example, the UE initiates a service request procedure including the low priority indication to use an available PDN connection, and may initiate the NAS signaling which does not include the low priority (setting the device property IEs as 0) when the UE receives the rejection message from the network by the NAS level mobility management congestion control or the APN-based mobility management congestion control.

When the UE 100 configured to support the dual priority application transmits a NAS signaling request message without including the low priority (setting the device property IEs as 0) by the application 101-1 or 101-2 which desires to perform the NAS signaling without including the low priority, if a mobility management signaling congestion, an APN-based mobility management congestion control, or an EPS Session Management (ESM) congestion control related to a particular APN is activated in the network and the UE receives a rejection message including a mobility management back-off timer or a session management back-off timer from the network, the UE starts the back-off timer with a back-off timer value provided through the rejection message.

When the NAS signaling request message leading to the rejection message or related to the rejection message does not include the low priority indication, the UE may set or store a back-off timer cause value indicating that the NAS signaling request message does not include the low priority indication. The back-off timer cause value may be removed when the back-off timer expires.

In another method, the network may insert the low priority indication of the NAS signaling message leading to the rejection message or related to the rejection message into a NAS signaling rejection message and transmit the NAS signaling rejection message. For example, the cause value may be defined in an EMM cause or a new Information Element (IE) may be added. In this case, the UE may set or store low priority indication information included in the reject message together with the back-off timer.

When the back-off timer by the NAS signaling request which does not include the low priority indication operates, the UE 100 may not initiate the NAS signaling request except for some of the aforementioned specific conditions such as an emergency service and the like.

Although the embodiments of the present invention have been described for illustrative purposes, those skilled in the art will appreciate that various modifications, additions and substitutions are possible, without departing from the scope and spirit of the invention. Therefore, exemplary aspects of the present disclosure have not been described for limiting purposes. The scope of the present invention shall be construed on the basis of the accompanying claims in such a manner that all of the technical ideas included within the scope equivalent to the claims belong to the present invention.

The invention claimed is:

1. A signaling method executed by a User Equipment (UE) configured to perform Non-Access Stratum (NAS) signaling including a low access priority indication and configured that a low access priority can be overridden, the signaling method comprising:
   performing a session management procedure including the low access priority;
   receiving a timer value for a session management back-off timer due to a session management congestion control, and operating the session management back-off timer with the timer value; and
   performing the session management procedure without including the low access priority while the session management back-off timer is running;
   wherein the performing of the session management procedure including the low access priority includes configuring a radio resource control (RRC) connection establishment cause of an eNodeB as "delay tolerant"; and
   wherein the performing of the session management procedure without including the low access priority includes configuring the RRC connection establishment cause of the eNodeB as "mobile originated (MO) signaling" or "MO data".

2. The signaling method of claim 1, wherein the performing of the session management procedure without including the low access priority is initiated by a request of a higher layer application.

3. The signaling method of claim 1, further comprising:
   after the performing of the session management procedure without including the low access priority, when a session management back-off timer value is received due to the session management congestion control by a mobility management entity, starting the session management back-off timer with the session management back-off timer value received from the mobility management entity.

4. A signaling control method executed by a mobility management entity in a mobile communication network, the signaling control method comprising:
   receiving a first session management request including a low access priority from a User Equipment (UE), wherein a radio resource control (RRC) connection establishment cause is configured as "delay tolerant" in connection with the first session management request;
   transmitting a session management rejection message including a timer value for a session management back-off timer to the UE in response to the first session management request;
   receiving one of a second session management request which does not include the low access priority and a third session management request including an indication which is not the low access priority from the UE while the session management back-off timer is running, wherein the RRC connection establishment cause is configured as "mobile originated (MO) signaling" or "MO data" in connection with the second session management request or the third session management request;
   determining whether the UE can perform a dual priority operation in which the low access priority is overridden when the second session management request or the third session management request is received; and
   performing an attach procedure when the UE can perform the dual priority operation.

5. The signaling control method of claim 4, wherein the determining of whether the UE can perform the dual priority operation comprises inquiring, of a subscriber information server, about whether the UE can perform the dual priority operation.

* * * * *